United States Patent [19]
Edwards

[11] Patent Number: 5,949,221
[45] Date of Patent: Sep. 7, 1999

[54] LINE POWERED, PRIMARY SIDE CONNECTED APPARATUS INJECTING VOLTAGE COMPENSATION INTO AN ELECTRIC POWER LINE USING ONE TRANSFORMER

[75] Inventor: Charles Wood Edwards, Monroeville, Pa.

[73] Assignee: Siemens Westinghouse Power Corporation, Orlando, Fla.

[21] Appl. No.: 09/082,572

[22] Filed: May 21, 1998

[51] Int. Cl.⁶ .................................................. G05F 1/70
[52] U.S. Cl. ........................................... 323/209; 323/207
[58] Field of Search ................................... 323/207, 208, 323/209, 205

[56] References Cited

U.S. PATENT DOCUMENTS

| | | | |
|---|---|---|---|
| 3,424,971 | 1/1969 | Stackegard | 323/209 |
| 3,900,792 | 8/1975 | Moltgen | 323/207 |
| 4,009,433 | 2/1977 | Moltgen | 323/209 |
| 4,019,124 | 4/1977 | Moltgen | 323/209 |
| 4,674,024 | 6/1987 | Paice et al. | 363/71 |
| 5,329,222 | 7/1994 | Gyugyi et al. | 323/207 |
| 5,343,139 | 8/1994 | Gyugyi et al. | 323/207 |
| 5,347,166 | 9/1994 | Schauder | 307/113 |
| 5,355,295 | 10/1994 | Brennen | 363/40 |
| 5,469,044 | 11/1995 | Gyugyi et al. | 323/207 |
| 5,654,625 | 8/1997 | Konstanzer et al. | 323/209 |

*Primary Examiner*—Robert E. Nappi
*Assistant Examiner*—Bao Q. Vu

[57] ABSTRACT

DVRs and APLCs utilize a single transformer for injection of compensating voltages into an ac power line and for drawing power from or exchanging power with the ac power line. The poles of an inverter are connected in series with the wye connected transformer primary winding which is also connected to the source end of the power line. A first secondary winding is connected to the load end of the power line. A rectifier circuit or a power interface inverter in the DVR and APLC, respectively, is connected to a second secondary winding on the transformer. For high pulse numbers, the rectifier circuit or interface inverter can have additional rectifier bridges or inverter poles connected to additional transformer secondary windings phase shifted with respect to each other. The single transformer can be a load transformer already provided in the power line, thereby further reducing the cost of the arrangement.

15 Claims, 4 Drawing Sheets

1

LINE POWERED, PRIMARY SIDE CONNECTED APPARATUS INJECTING VOLTAGE COMPENSATION INTO AN ELECTRIC POWER LINE USING ONE TRANSFORMER

BACKGROUND OF THE INVENTION

1. Field of the Invention

This invention relates to apparatus incorporating solid state inverters for providing compensation on a three-phase electric power line. More particularly, it relates to apparatus which injects a compensating voltage into the power line in series, such as for example, a dynamic voltage restorer or an active power line conditioner. The inverters are connected to the primary windings of the single transformer and are line powered through additional secondary windings on the transformer.

2. Background Information

There are various types of apparatus for providing compensation on electric power lines which incorporate power inverters. One such system is the Dynamic Voltage Restorer (DVR) an example of which is described in U.S. Pat. No. 5,329,222. The DVR injects a voltage in series with a utility source for the purpose of making up missing voltage that occurs when upstream faults cause short term voltage sags. The DVR described in the above mentioned patent uses three single-phase inverter modules with a common dc link which are connected to the utility line through injection transformers. The common dc link approach allows the use of one common source of energy to supply three separate injection systems, one for each phase, in a three-phase system. This common source of energy can be for instance, a capacitor bank or an interface to draw the required power from the line, even when the voltage is sagged. The injection transformers isolate the power electronics from the power line allowing the maximum injection capacity to be less than the source voltage. It has been shown that the vast majority of sags in utility systems are less than 50% of the phase-to-neutral voltage. The DVR can correct these sags with an inverter rating of less than the connected downstream load which is protected by the DVR.

In practice, the inverter modules of the DVR can be implemented as individual power devices, if the ratings are high enough; series strings of power devices as is the present practice and described in U.S. Pat. No. 5,347,166; or single-phase inverter modules as described in U.S. Pat. No. 4,674,024. Larger units, using magnetics for phase-staggered waveform mixing are also possible.

As previously stated, the topologies which have an injection transformer allow a common dc link and energy storage interface since the injection transformer provides the required isolation. This technique requires three single-phase or one three-phase transformer with a five leg core since such a transformer must support zero sequence voltage components.

In many applications, it is possible, and even desirable to derive the power required to make up a sag from the source. No significant energy storage is provided. For instance, a line powered DVR is known in which a three-phase transformer having a rectifier bridge connected to the secondary draws power directly from the power line. This arrangement not only requires the injection transformers but also the three-phase transformer for drawing power from the line. When the input voltage sags, the line powered DVR responds by drawings more current from the source to provide the power required by the load. The product of the positive sequence source voltage and current remains constant.

patent application Ser. No. 09/017,034, filed Feb. 2, 1998, proposes a neutral point connected DVR in which a three-phase inverter wye connects the secondary windings of a three-phase load transformer to the load end of the power line. This eliminates the need for injection transformers and in fact does not require any additional transformers where the load transformer is already present in the system. In a line powered version of the neutral point connected DVR, the inverter is powered from the load side. If the inverter is to optimized for fifty percent injection, a line power transformer is required. This means that a total of two transformers are required.

Commonly owned Patent Application entitled Power Inverter Apparatus Using The Load Transformer Of An AC Power Line To Insert Series Compensation (Attorney Docket No. RDM 97-037), concurrently filed in the name of C. G. Hochgraf, discloses several methods of connecting an inverter to the primary or source side of a transformer in a DVR. This system has some advantages in common with the neutral point connected DVR. It keeps the transformer voltage constant during a sag condition, whereas the neutral point connected DVR keeps only the load voltage constant. In this version, only one transformer is required in most cases. In versions of this system where the primary winding is delta connected, and a three-phase inverter with a common dc link is used to provide the voltage compensation, one single-phase injection transformer is needed to provide the required isolation.

Another type of compensation equipment which uses series injection with transformer coupling is the active power line conditioner (APLC). The APLC includes a series inverter and a parallel inverter connected by a common dc link. The parallel inverter transfers real power to and from the series inverter and also supplies harmonic currents and the reactive component of the load current. The series path in the APLC suffers from the same limitations as the DVR due to the series injection transformer discussed above patent application Ser. No. 09/017,034, filed Feb. 2, 1998, discussed above, discloses connection of the parallel inverter to the load side of the power line. While this APLC eliminates the need for injection transformers by using the neutral point connection for the series inverter, it requires an additional transformer for the connection of the parallel inverter to the load side of the power line, if the inverter system is partially rated.

While these improved DVRs and APLCs have reduced the cost of an installation by eliminating or reducing the number of transformers needed for series injection of voltage compensation into a power line, the APLC, and the DVR if it is to be line powered and take advantage of the partial rating, still require a separate transformer connected to the power line.

There is a need therefore for improved DVRs and APLCs which do not require a separate or additional transformer to draw power from the line.

SUMMARY OF THE INVENTION

This need and others are satisfied by the invention which is directed to apparatus for providing compensation in an ac power line which includes transformer means having a primary winding connected to the source end of the ac power line and at least two secondary windings with one of the secondary windings connected to the load end of the power line. Inverter means connected to the primary winding adds compensating voltage to the voltage presented to the primary winding by the source to provide the compensation. A dc interface connected to the second of the secondary windings and to the inverter means supplies dc voltage to the inverter means from the power line. For DVRs, the interface includes rectifiers for deriving the dc voltage from the power line. For APLC operation, additional inverter means are provided in the dc interface to exchange power with the power line.

While the invention is applicable to ac power lines with any number of phases including a single phase, it is particularly applicable to the conventional three-phase ac power line. In such applications, the inverter means is also three-phase and adds a compensating voltage to each phase of the primary winding. The secondary windings, including the second secondary winding which provides power to the inverter means, are also three-phase windings. Additional three-phase secondary windings, all phase shifted from each other and the second secondary winding, can be utilized to provide higher pulse count power to the rectifiers to reduce the harmonics imposed on the power line.

The three-phase primary winding is wye connected. The inverter phases connect each of the primary windings to a common neutral node. A three-phase inverter is preferred as it reduces the number of inverter poles required and can be fed by a common dc interface.

The invention is also applicable to APLCs. In that case, the dc interface is another inverter which is connected to the second secondary winding on the transformer. For a three-phase ac power line, the interface inverter is a three-phase inverter and the second secondary winding can be either wye or delta connected. Where the load end of the ac power line has a fourth, neutral conductor, the interface inverter has a fourth pole connected to the neutral point of the wye connected second secondary winding.

The invention allows series injection of compensating voltages into a power line using line power with only a single transformer, which in many installations is already available in the form of a load transformer. It also makes it possible with the use of only one transformer to provide a higher pulse number for the dc interface which reduces the harmonic load on the source.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
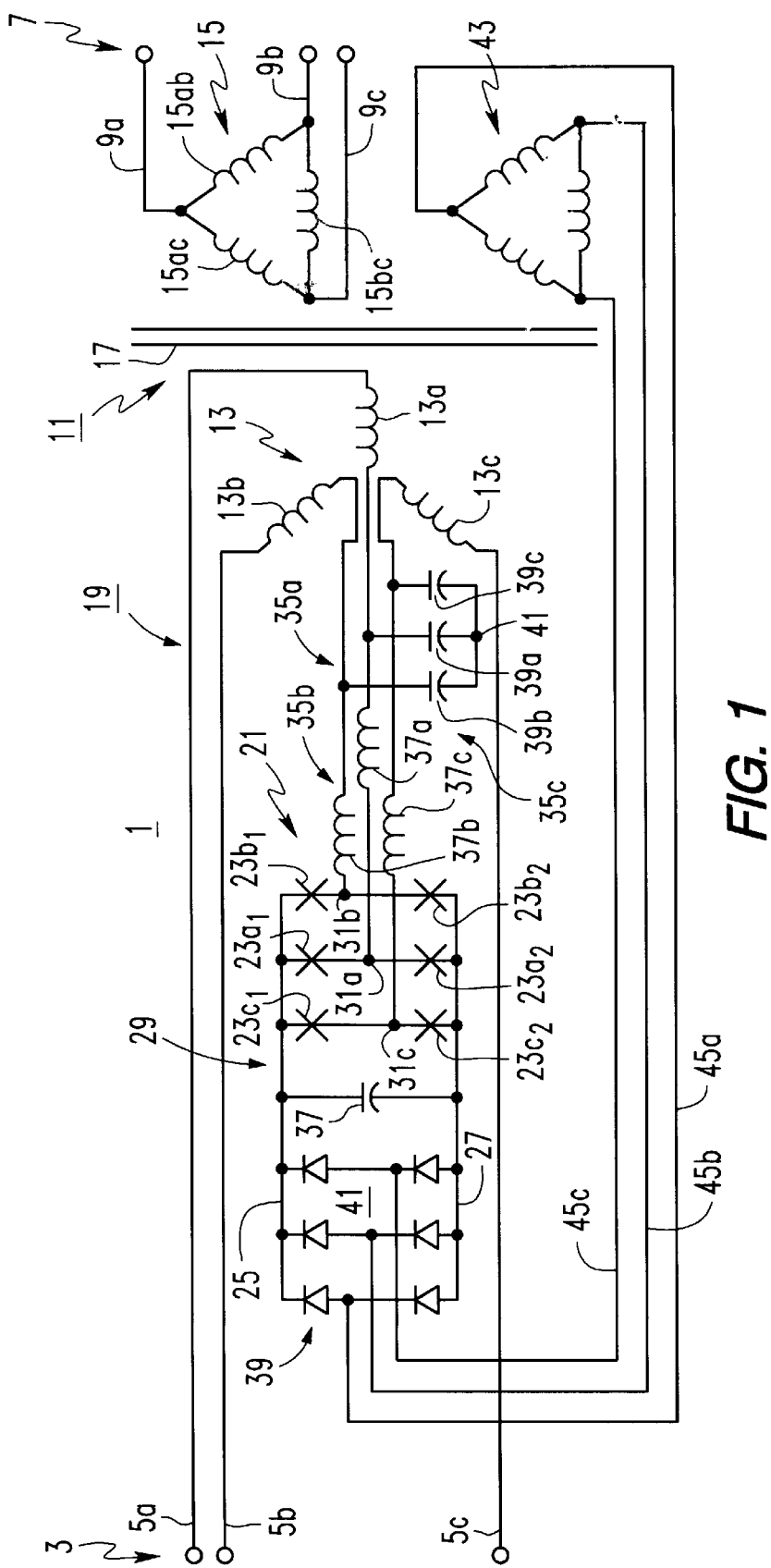
FIG. 1 is a schematic circuit diagram of a line powered primary side connected DVR using one transformer in accordance with the invention.

FIG. 1 illustrates application of the invention to a primary side connected DVR with a line power connection which requires only one transformer. The three-phase ac power line 1 has a source end 3 with three source end phase conductors 5a–5c and a load end 7 with three-phase conductors 9a–9c. A three-phase transformer 11 couples the source end phase conductors 5a–5c with the load end conductors 9a–9c. The three-phase transformer 11 has a three-phase primary winding 13 with windings 13a–13c wye connected to the source end phase conductors 5a–5c of the source end 3. The transformer 11 has a first three-phase secondary winding 15 with windings 15ab, 15ac, 15bc, connected to the load end phase conductors 9a–9c of the load end 7. While the first secondary winding 15 is shown delta connected to the load end, it could alternatively be wye connected. The primary winding 13 and first secondary winding 15 are wound on a common core 17. Such a load transformer 11 is typically provided in an ac power line so that high voltage may be used for transmission efficiency and then stepped down to a lower voltage for distribution to the loads.

A DVR 19 is utilized to provide compensation for voltage sags in the ac power line 1. The DVR 19 includes an inverter arrangement 21, which in the exemplary embodiment, is a single three-phase inverter. As is well known, the three-phase inverter 21 includes pairs of switching devices $23a_1$, $23a_2$–$23c_1$, $23c_2$ connected between the positive and negative rails 25, 27 of a common dc link 29. For power applications, the switches 23 can be devices such as insulated gate bipolar transistors (IGBTs) or gate turn off devices (GTOs). In the three-phase inverter 21 each of the pairs of switching devices forms a pole with an ac terminal 31a–31c which is connected to the common end of a corresponding primary winding 13a–13c of the transformer. The inverter 21 provides a conduction path for the wye connected primary windings and the ac voltage generated by each of the inverter poles is direct connected in series with the corresponding primary winding 13a–13c.

Filtering is provided by LC filters 35 connected between the ac terminals 33a–33c of the inverter 21 and the common ends of the transformer primary windings 13a–13c. Each of these LC filters 35 includes a series inductor 37a–37c and a shunt capacitor 39a–39c connected to a common node 41. A delta connected filter is also possible. The firing of the switches 23 in the inverter 21 is controlled to provide compensating voltages which are summed with the voltages delivered by the source 3 to make up for the voltage sags.

The dc link 29 incorporates a dc smoothing device 37 in the form of a large capacitor. Power for the inverter 21 is provided through a dc interface 39 which, in the embodiment of FIG. 1, is a three-phase, full wave rectifier 41, also known as a six-pulse rectifier bridge. This six-pulse rectifier bridge 41 is connected to a second three-phase secondary winding on the transformer 11 by leads 45a–45c. This second secondary winding 43 is wound on the common transformer core 17. While both of the secondary windings 15 and 43 are illustrated as delta connected windings, other arrangements can be used.

The arrangement of FIG. 1 greatly reduces the cost of a line powered DVR. By direct connecting phases of the three-phase inverter 21 in series with the primary windings 13a–13c of the transformer 11, the need for separate injection transformers is eliminated. In addition, use of another secondary winding on the transformer to provide power for the inverter 21 eliminates the need for the power transformer typically provided to power the inverter from the ac power line 1. As a load transformer 11 is typically already provided in the power line, no additional transformers are required for the DVR although the additional secondary winding must be provided. The cost of this is much less than providing a separate power transformer.

Figure 2:
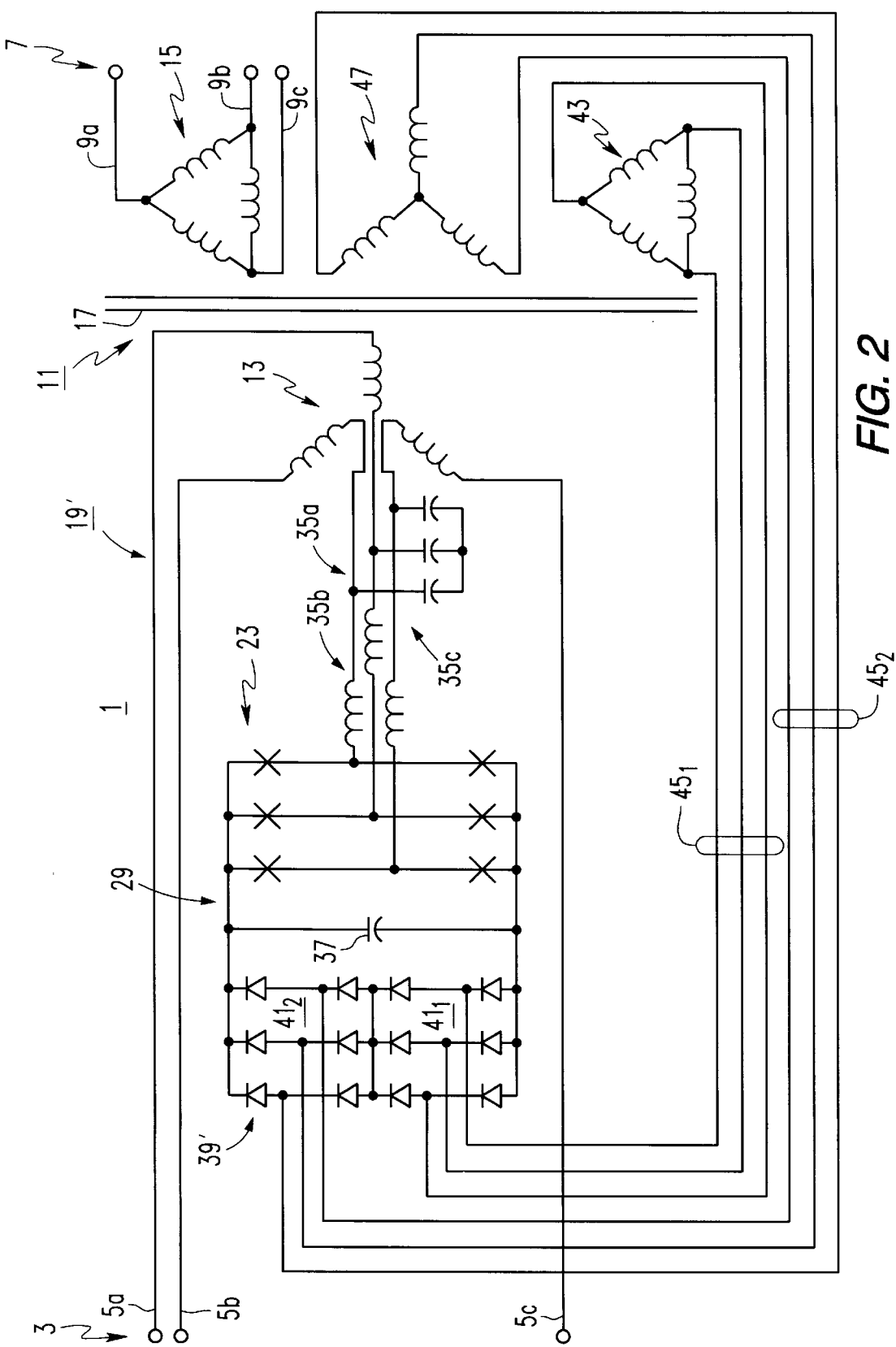
FIG. 2 is a schematic circuit diagram of a twelve-pulse version of the line powered primary side connected DVR of FIG. 1.

FIG. 2 illustrates a modified form of a line powered primary side connected DVR 19' which has an interface 39' with a twelve pulse rectifier system. In this arrangement, two six-pulse rectifier bridges $41_1$ and $41_2$ power the dc link 29. The first six-pulse rectifier bridge $41_1$ is fed by the second three-phase secondary winding 43 through leads $45_1$ while the second six-pulse rectifier bridge $41_2$ is energized by an additional three-phase secondary winding 47 through leads $45_2$. As noted, the second secondary winding 43 and the additional secondary winding 47 are phase shifted with respect to one another. This is accomplished by a delta connection for the second secondary winding 43 and a wye connection for the additional secondary winding 47. The twelve-pulse rectifier system reduces the harmonic currents in the rectifier circuit and thus the higher harmonic currents reflected to the source. More additional secondary windings 47 with different transformer 11 to power addition to the transformer 11 to power additional six-pulse rectifier bridges (not shown) to provide higher pulse numbers. This can still be achieved with the one transformer 11 having only one transformer core 17 thereby keeping the cost to a minimum.

Figure 3:
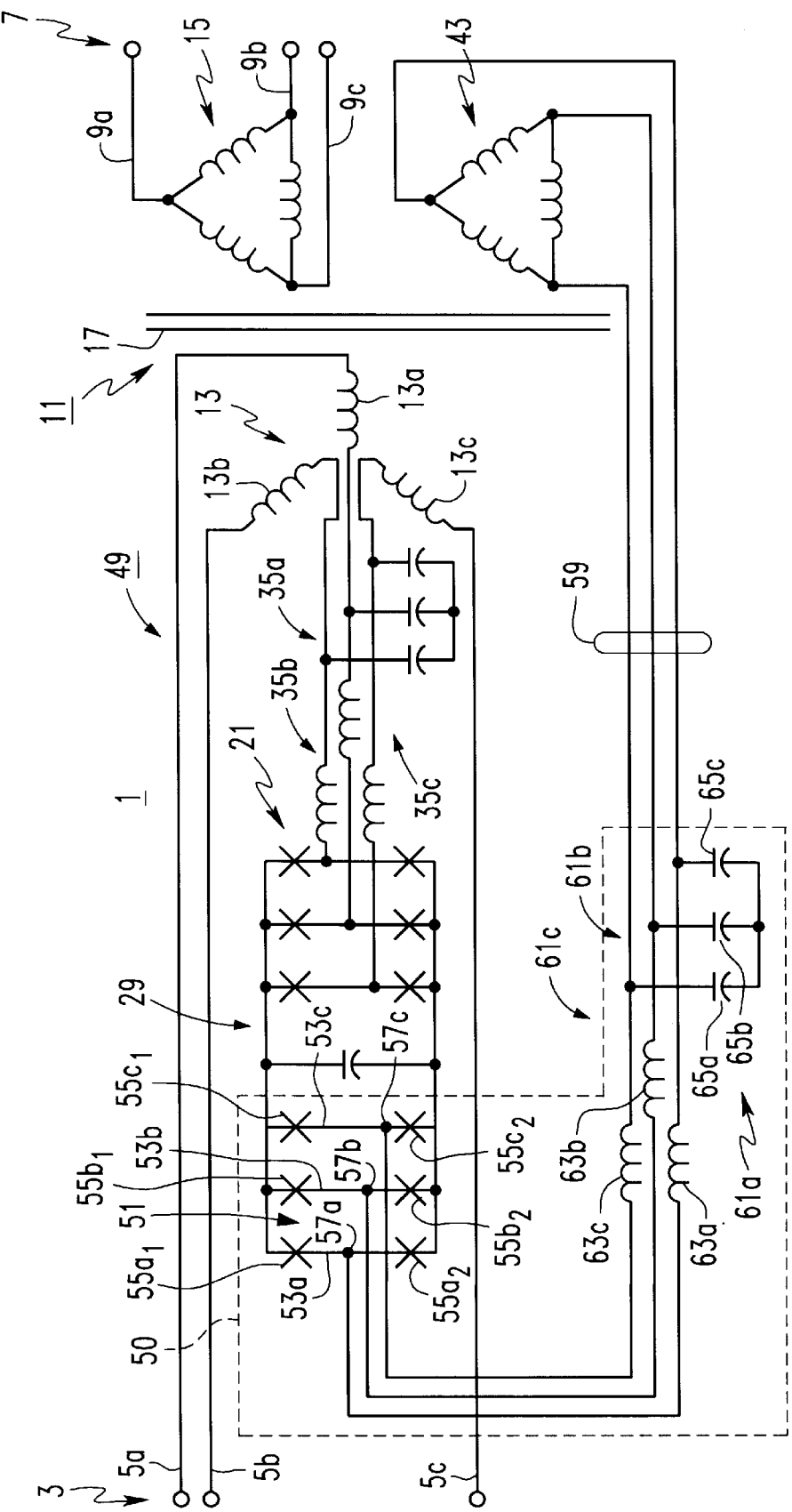
FIG. 3 is a schematic circuit diagram of a line powered primary side connected APLC with a single transformer for a three-wire system.

The present invention can also be applied to APLCs using a single transformer. Such an arrangement is shown in FIG. 3 where the APLC 49 utilizes a similar three-phase inverter 21 to add compensating voltages in series with the voltages derived by the source 3. The difference is that the dc interface 50 employs a second interface inverter 51 having inverter poles 53a–53c formed by switches $55a_1$, $55a_2$–$55c_1$, $55c_2$. The ac terminals 57a–57c of the interface inverter 51 are connected to the second secondary winding 43 of the transformer 11 through the leads 59. Additional LC filters 61a–61c comprising series inductors 63a–63c and shunt capacitors 65a–65c are included in the leads 59. The switches $55a_1$–$55c_2$ are fired to control the exchange of real power between the APLC and the line 1 in a manner which is known and to absorb load harmonics.

Figure 4:
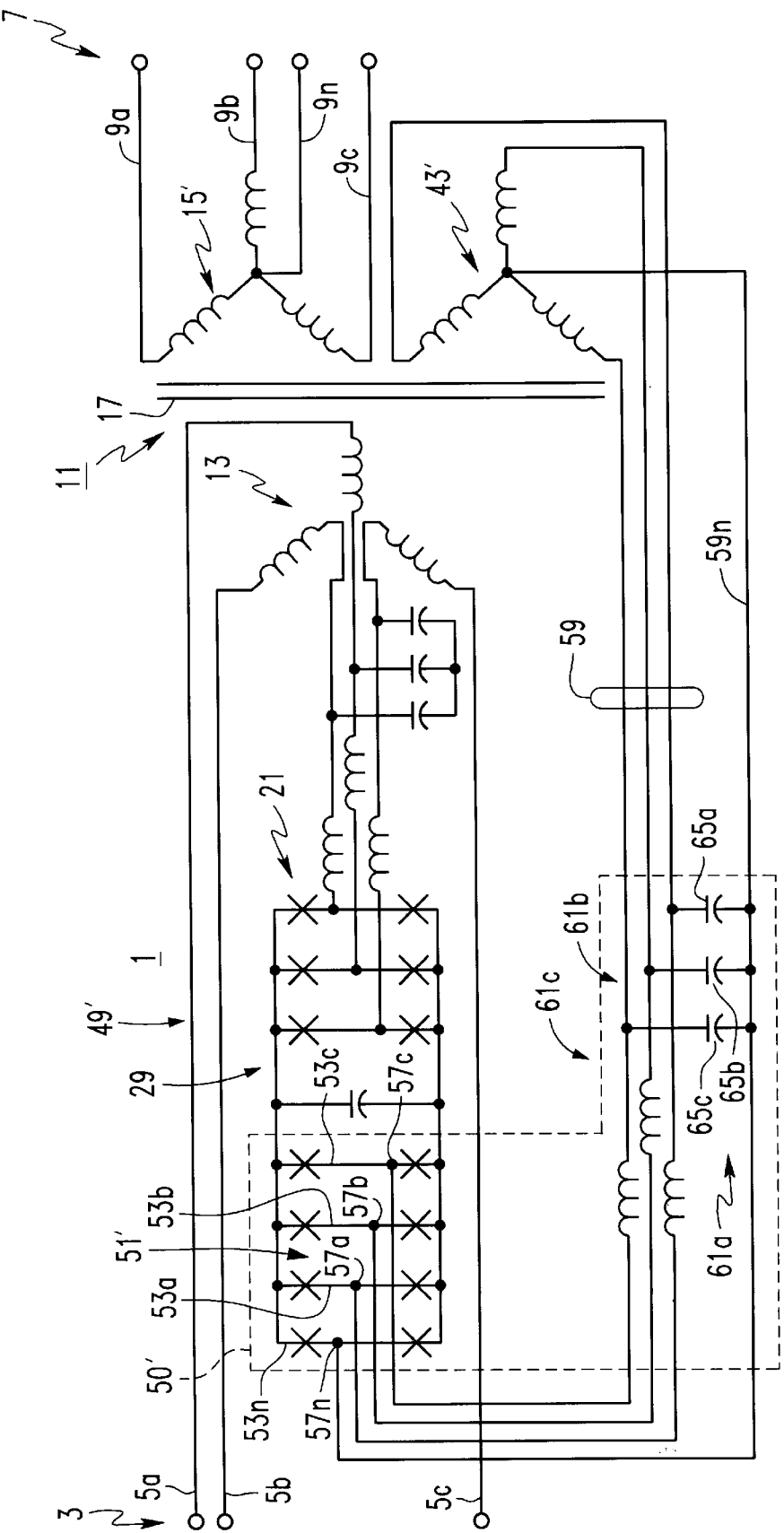
FIG. 4 is a schematic circuit diagram similar to FIG. 5 for a four-wire system.

FIG. 4 illustrates an APLC 49' in accordance with the invention adapted for use with a power line having a fourth, neutral load conductor 9n. In this case, the interface inverter 51' of the dc interface 50' includes a fourth, neutral pole 53n having an ac terminal 57n which is connected to the neutral point of the wye connected three-phase second secondary winding 43' through a neutral conductor 59n to which the filter capacitors 65 are connected.

The invention provides a low cost way of implementing a line powered DVR or APLC using only one three-phase transformer. The advantages of this circuit topology include: one three-phase transformer provides the line power derivation function, an injection connection and voltage step-down (or up) if desired; and, during a sag of less than or up to the injection capacity, the inverter maintains the transformer voltage as if the sag never occurred. There are no extreme transformer flux excursions which tend to drive the transformer into saturation. Finally, if a voltage conversion transformer is required at the installation location anyway, the total cost of the combined DVR or APLC and voltage conversion function results in an even lower overall cost.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breath of the claims appended and any and all equivalents thereof.

What is claimed is:

1. Apparatus for providing compensation in an ac power line between a source end and a load end; said apparatus comprising:

transformer means having a primary winding connected to the source end of said ac power line, and at least two secondary windings, a first of which is connected to the load end of said ac power line;

inverter means connected to said primary winding to add compensating voltage to voltage generated by said primary winding; and dc interface means connected to a second of said secondary windings and to said inverter means to supply dc voltage to said inverter means.

2. The apparatus of claim 1 adapted for use with a three-phase ac power line wherein said transformer means comprises a three-phase transformer, said primary winding is a three-phase primary winding, said secondary windings are each three-phase secondary windings, and said inverter means is connected to provide a compensating voltage in series with each phase of said three-phase primary winding.

3. The apparatus of claim 2 wherein said inverter means comprises a three-phase inverter connected to said three-phase primary winding, and wherein said dc interface means comprises a common dc interface supplying a common dc voltage to all phases of said three-phase inverter.

4. The apparatus of claim 3 wherein said three-phase inverter provides a conduction path for the primary winding in a wye connection.

5. The apparatus of claim 3 wherein said common dc interface includes a rectifier bridge generating said common dc voltage.

6. The apparatus of claim 5 wherein said rectifier bridge is a six pulse rectifier bridge.

7. The apparatus of claim 5 wherein said three-phase inverter provides a conduction path for the primary winding in a wye connection.

8. The apparatus of claim 5 wherein said transformer means comprises additional three-phase secondary winding each phase displaced from said second secondary winding and from each other, and wherein said common dc interface comprises additional rectifier bridges each connected to a different one of said additional secondary winding on said three-phase transformer.

9. The apparatus of claim 8 wherein said three-phase inverter provides a conduction path for the primary winding in a wye connection.

10. The apparatus of claim 3 wherein said common dc interface comprises interface inverter means connected to said second three-phase secondary winding providing said common dc voltage to said three-phase inverter connected to said three-phase primary winding.

11. The apparatus of claim 2 wherein said three-phase transformer comprises additional three-phase secondary windings each phase displaced from said second secondary winding and from each other, and wherein said dc interface means comprises rectifier bridges each connected to a different one of said second three-phase secondary winding and said additional three-phase secondary windings.

12. The apparatus of claim 1 wherein said dc interface means includes interface inverter means for exchanging power with said ac power line through said second secondary winding.

13. The apparatus of claim 12 adapted for use with a three-phase ac power line wherein said transformer means comprises a three-phase transformer, said primary winding is a three-phase primary winding, said secondary windings are each three-phase secondary windings, said inverter means is connected to provide a compensating voltage in series with each phase of said three-phase primary winding, and said interface inverter means is three-phase interface inverter means for exchanging power with said three-phase ac power line through said second three-phase secondary winding.

14. The apparatus of claim 12 wherein said transformer means includes additional secondary windings each phase displaced from each other, and wherein said dc power interface includes additional interface inverter means each connected to a different one of said additional secondary windings.

15. The apparatus of claim 14 adapted for use with a three-phase ac power line wherein said primary winding and said secondary windings of said transformer means are all three-phase windings and wherein said inverter means and said interface inverter means are three-phase inverter means.

* * * * *